US 8,503,478 B2

(12) United States Patent
Komatsu

(10) Patent No.: US 8,503,478 B2
(45) Date of Patent: Aug. 6, 2013

(54) RECEIVING APPARATUS, RECEIVING METHOD AND PROGRAM THEREOF

(75) Inventor: Masahiro Komatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 4 days.

(21) Appl. No.: 13/262,958

(22) PCT Filed: Apr. 21, 2010

(86) PCT No.: PCT/JP2010/057513
§ 371 (c)(1),
(2), (4) Date: Oct. 5, 2011

(87) PCT Pub. No.: WO2010/126068
PCT Pub. Date: Nov. 4, 2010

(65) Prior Publication Data
US 2012/0142303 A1 Jun. 7, 2012

(30) Foreign Application Priority Data
Apr. 27, 2009 (JP) ................................. 2009-107969

(51) Int. Cl.
H04J 3/16 (2006.01)
(52) U.S. Cl.
USPC .......................................... 370/466; 370/469
(58) Field of Classification Search
USPC .................. 455/334, 130; 370/469, 466, 467
See application file for complete search history.

(56) References Cited

U.S. PATENT DOCUMENTS

| 6,831,913 | B1 * | 12/2004 | Vialen | 370/349 |
| 7,876,781 | B2 * | 1/2011 | Meyer et al. | 370/469 |
| 7,876,782 | B2 * | 1/2011 | Yeo et al. | 370/469 |
| 8,130,633 | B2 * | 3/2012 | Gibbs et al. | 370/216 |

FOREIGN PATENT DOCUMENTS

| JP | 2005503712 A | 2/2005 |
| JP | 2006514817 A | 5/2006 |
| JP | 2008515329 A | 5/2006 |

OTHER PUBLICATIONS

International Search Report for PCT/JP2010/057513 mailed Jun. 22, 2010.

* cited by examiner

Primary Examiner — Sonny Trinh

(57) ABSTRACT

A receiving apparatus is to receive data by use of a second protocol data unit, which stores first protocol data units of a first layer set for each of multiple radio bearers and which is based on a second layer corresponding to a lower layer of the first layer. The apparatus includes a providing unit that provides the first protocol data unit, which is stored in the second protocol data unit with specific information specifying the second protocol data unit in the second layer. The apparatus includes a discarding unit that provides another first protocol data unit, which is stored in the second protocol data unit storing the erroneous first protocol data unit with reference to the specific information in the case that a predetermined first protocol data unit includes an error in the first layer.

6 Claims, 8 Drawing Sheets (A)

(B)

(C)

RECEIVING APPARATUS, RECEIVING METHOD AND PROGRAM THEREOF

TECHNICAL FIELD

The present invention relates to a receiving apparatus, a receiving method and a program thereof.

Background Art

A mobile communications system, which uses radio communication, becomes prevailing. FIG. 6 is a block diagram showing a general configuration of a radio access network in a Mobile communications system based on the LTE (Long Term Evolution) scheme. The radio access network in the mobile communications system based on the LTE scheme (E-UTRAN: Evolved Universal Terrestrial RAN) includes a mobile station UE (User Equipment) and a radio base station eNB (E-UTRAN NodeB). The mobile station UE and the radio base station eNB communicate each other via RL (Radio Link).

Each of the mobile station UE and the radio base station eNB includes the PDCP (Packet Data Convergence Protocol) sub-layer, the RLC (Radio Link Control) sub-layer, the MAC (Medium Access Control) sub-layer, the physical (PHY: Physical) layer and a radio unit.

Here, a receiving side apparatus (for example, radio base station eNB) extracts data which is transmitted by a sending side apparatus (for example, mobile station UE) through carrying out a PHY process, a MAC process, a RLC process and a PDCP process in this order for a radio signal which the radio unit receives.

FIG. 7 is a block diagram showing a general configuration of the receiving apparatus in the mobile communications system shown in FIG. 6. A MAC SDU (Service Data Unit) sending unit 101 of the MAC sub-layer sends MAC SDU to an erroneous PDU (Protocol Data Unit) discarding unit 102 of the RLC sub-layer. The erroneous PDU discarding unit 102 receives MAC SDU, which is sent by the MAC SDU sending unit 101, as RLC PDU. The erroneous PDU discarding unit 102 discards an erroneous RLC PDU and sends a correct RLC PDU to a receiving data storage processing unit 103. The receiving data storage processing unit 103 stores the correct RLC PDU in a receiving buffer memory and carries out a sequence correcting process to correct receiving sequence of RLC PDU which is stored in the receiving buffer memory. In the case that RLC SDU can be restored on the basis of RLC PDU stored in the receiving buffer memory, a SDU restoring unit 104 restores RLC SDU and sends the restored RLC SDU to the PDCP sub-layer.

Since the erroneous RLC PDU is discarded, it is possible to prevent RLC SDU, which includes abnormal data, from being restored.

For example, patent document 1 discloses an art that MAC-d SDU is restored in the receiving end MAC-d sub-layer on the basis of MAC-d PDU Which is received from a lower layer, and MAC-d SDU is processed as RLC PDU.

[Preceding Technical Document]
[Patent Document]
[Patent document 1] Japanese Patent Application Laid-Open Publication No. 2008-515329.

SUMMARY OF THE INVENTION

Problem to be Solved by the Invention

Since a process of the RLC sub-layer is carried out per RB (Radio Bearer), discarding the erroneous RLC PDU is also carried out per RB.

Incidentally, FIG. 8 shows a general MAC PDU. It is understood according to FIG. 8 that RLC PDUs of a plurality of RBs are multiplexed into MAC PDU ("multiplex" can be also expressed as "store"). In the case that RLC PDU of a specific RB includes an error, there is a high possibility that also RLC PDU of another RB, which is stored in the same MAC PDU, includes an error.

In the case that the erroneous PDU discarding unit 102 cannot detect an error of RLC PDU of another RB, RLC SDU is restored by use of abnormal data, that is, the erroneous RLC PDU. In this case, there is a danger that it is impossible to obtain correct data and furthermore, it is impossible to carry out normal RLC process since, in the case that RLC control PDU, which is included in RLC PDU and which is control information used in RLC, includes abnormal data, RLC works abnormally.

Therefore, it is necessary to make it more accurate to distinguish the erroneous RLC PDU.

Accordingly, an object of the present invention is to solve the above-mentioned problem, that is, to provide a receiving apparatus, a receiving method and a program thereof which can discard erroneous data more surely and consequently can receive correct data more surely.

Means to Solve the Problem

In order to solve the above-mentioned problem, a receiving apparatus according to the present invention to receive data by use of a second protocol data unit, which stores a plurality of first protocol data units of a first layer set for each of plural radio bearers and which is based on a second layer corresponding to a lower layer of the first layer, includes a providing means for providing the first protocol data unit, which is stored in the second protocol data unit with specific information specifying the second protocol data unit in the second layer and a discarding means for discarding another first protocol data unit, which is stored in the second protocol data unit storing the erroneous first protocol data unit with reference to the specific information in the case that a predetermined first protocol data unit includes an error in the first layer.

A receiving method according to the present invention to receive data by use of a second protocol data unit, which stores a plurality of first protocol data units of a first layer set for each of plural radio bearers and which is based on a second layer corresponding to a lower layer of the first layer, includes providing the first protocol data unit, which is stored in the second protocol data unit with specific information specifying the second protocol data unit in the second layer and discarding another first protocol data unit, which is stored in the second protocol data unit storing the erroneous first protocol data unit with reference to the specific information in the case that a predetermined first protocol data unit includes an error in the first layer.

A program according to the present invention makes a computer of a receiving apparatus to receive data by use of a second protocol data unit, which stores a plurality of first protocol data units of a first layer set for each of plural radio bearers and which is based on a second layer corresponding to a lower layer of the first layer, execute processes including a process of providing the first protocol data unit, which is stored in the second protocol data unit with specific information specifying the second protocol data unit in the second layer and a process of discarding another first protocol data unit, which is stored in the second protocol data unit storing the erroneous first protocol data unit with reference to the specific information in the case that a predetermined first protocol data unit includes an error in the first layer.

Effect of the Invention

According to the present invention, it is possible to provide the receiving apparatus and the receiving method which can discard the erroneous data more surely, and consequently can receive correct data more surely.

EXEMPLARY EMBODIMENT TO CARRY OUT THE INVENTION

Hereinafter, a receiving apparatus according to a first exemplary embodiment of the present invention will be described with reference to FIGS. 1 to 4.

Figure 1:
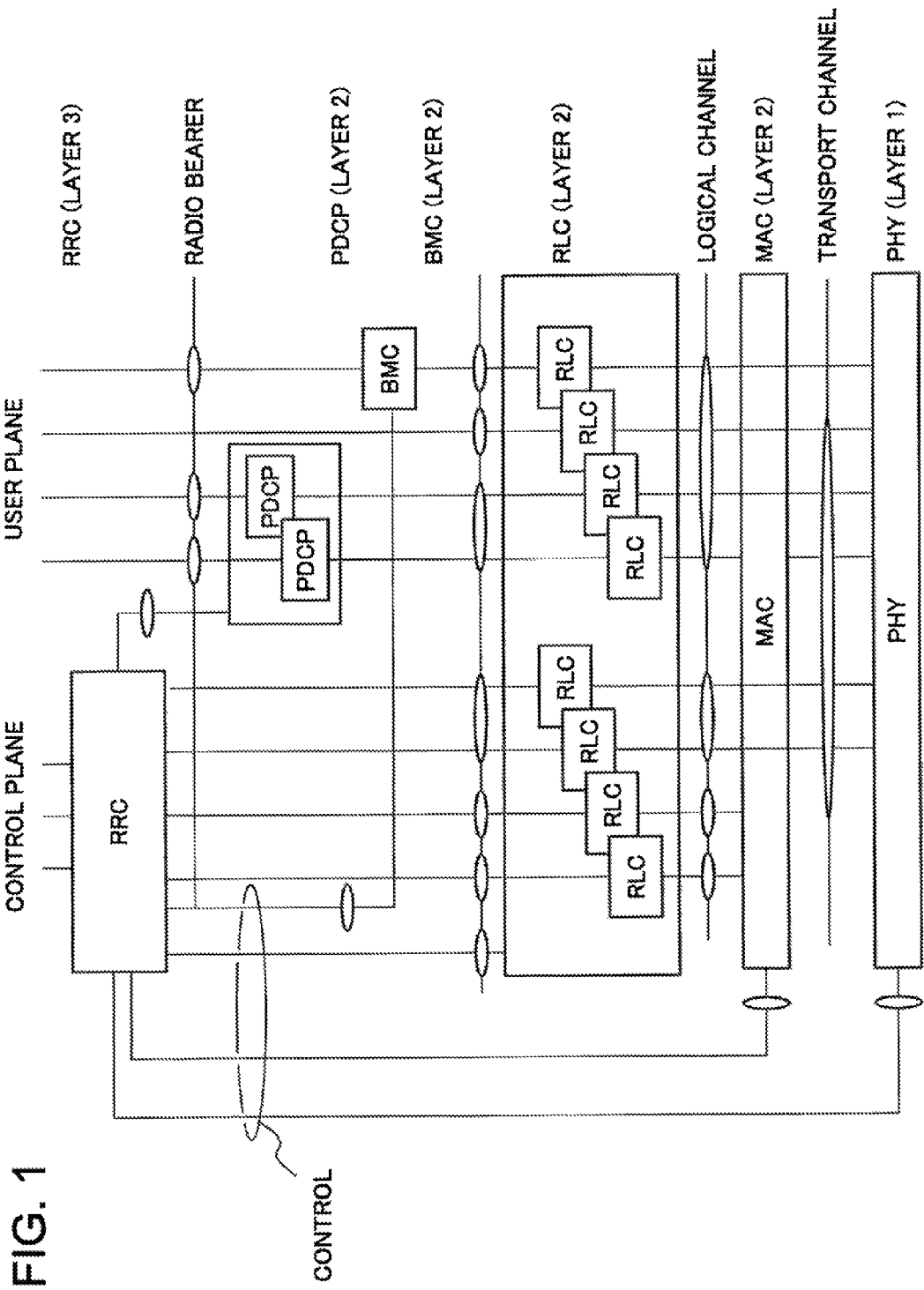
[FIG. 1] shows a protocol stack of a radio access network in a mobile communication system based on the LTE scheme in relation to a first exemplary embodiment of the present invention.

FIG. 1 shows a protocol stack of a radio access network in a mobile communication system based on the LTE scheme in relation to the first exemplary embodiment of the present invention. LTE is a specification proposed by the standardization project of the third generation mobile communication system (3GPP: Third Generation Partnership Project) whose member are ETSI (European Telecommunications Standards Institute), ARIB/TTC (Association of Radio Industries and Business/Telecommunication Technology Committee) in Japan, T1 in United States, TTA (Telecommunication Technology Association) in Korea or the like. According to the mobile communications system based on the LTE scheme, a radio access method which is called to be E-UTRAN (Evolved Universal Terrestrial Radio Access Network) is adopted. The radio access network includes a mobile station UE (User Equipment) and a wireless base station eNB (E-UTRAN NodeB).

A protocol of the radio access network can be divided into the RRC (Radio Resource Control) layer, the PDCP (Packet Data Convergence Protocol) sub-layer, the RLC (Radio Link Control) sub-layer, the MAC (Medium Access Control) sub-layer and the PHY (PHYsical) layer. The PDCP sub-layer, the RLC sub-layer and the MAC sub-layer compose the data link layer. Moreover, the protocol of the radio access network can be divided into a user plane for transmission of data and a control plane for transmission of control information (Signaling). In the user plane, user data of a voice signal, an IP (Internet Protocol) packet or the like is transmitted, and in the control plane, control information on a network interface, call maintenance and management, or the like is transmitted.

The PHY (PHYsical) layer provides an upper layer with an information transfer service by use of a physical channel. Data is transferred between the PHY layer and the MAC sub-layer, which is an upper layer of the PHY layer, through a transport channel. Data is transferred between the sending side PHY layer and the receiving side PHY layer through the physical channel.

The MAC sub-layer is connected to the RLC sub-layer, which is an upper layer of the MAC layer, through a logical channel. In the MAC sub-layer, mapping between the logical channel and the transport channel is carried out, and a MAC parameter for allocation and reallocation of radio resources is assigned.

The RLC sub-layer supports reliable data transmission. The RLC sub-layer is arranged per a radio bearer. In the RLC sub-layer, a plurality of RLC SDUs are segmented or concatenated. In the PDCP sub-layer, compression or expansion of the packet is carried out. In the RRC layer, a basic work of the call admission control, the handover or the like is controlled.

Figure 2:
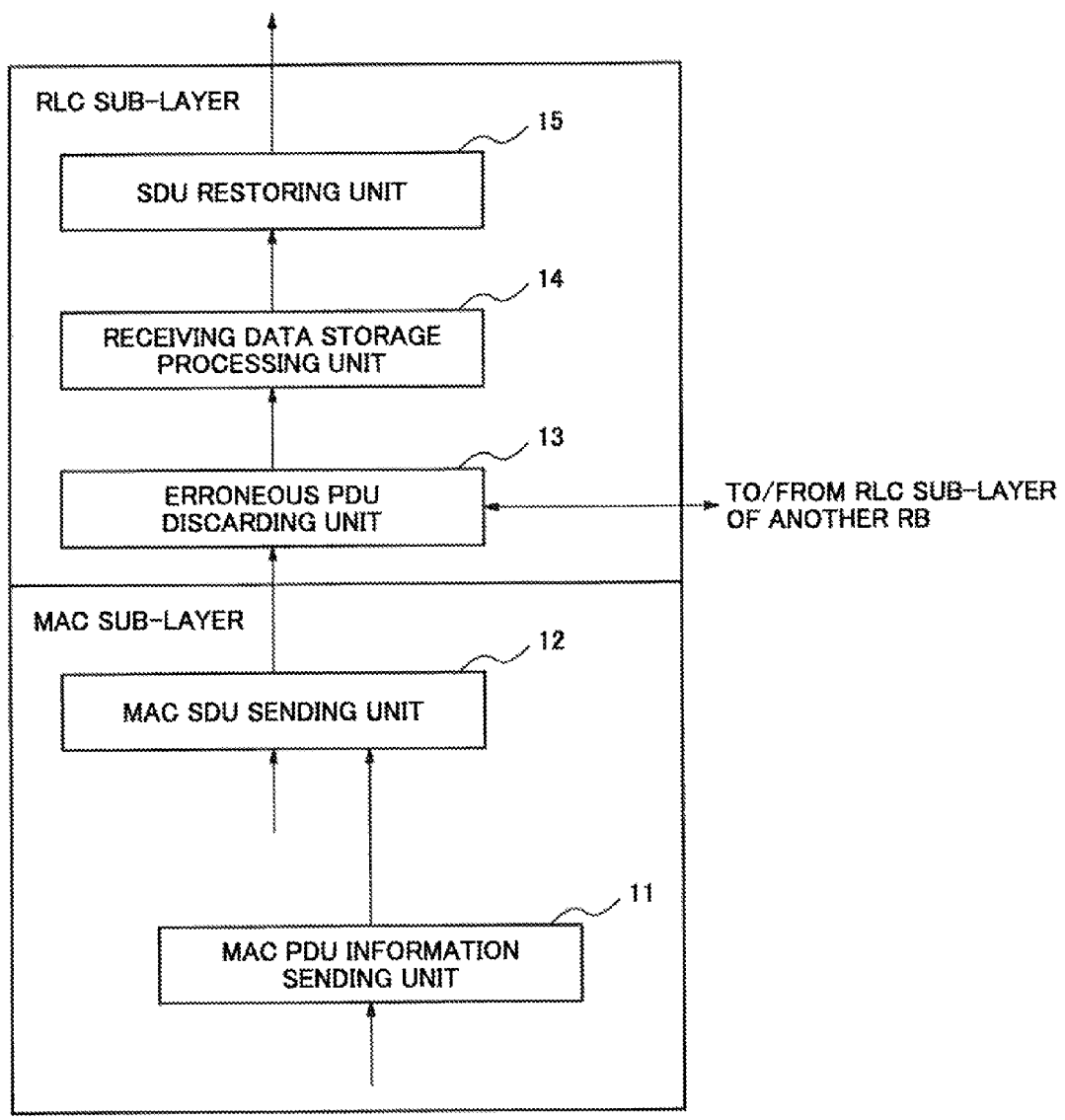
[FIG. 2] is a block diagram showing an exemplary configuration of a receiving apparatus according to the first exemplary embodiment of the present invention.

FIG. 2 is a block diagram showing an exemplary configuration of the receiving apparatus according to the first exemplary embodiment of the present invention. Here, the receiving apparatus means the mobile station UE in the case that the radio base station eNB is a sending apparatus, and means the radio base station eNB in the case that the mobile station UE is the sending apparatus.

The MAC sub-layer of the receiving apparatus includes a MAC PDU information sending unit 11 and a MAC SDU sending unit 12. The RLC sub-layer of the receiving apparatus includes an erroneous PDU discarding unit 13, a receiving data storage processing unit 14 and a SDU restoring unit 15.

The MAC PDU information sending unit 11 generates ID (Identification) which specifies MAC PDU, and SN (Serial Number) which indicates receiving sequence in the MAC sub-layer and sends the generated ID and the generated SN to the MAC SDU sending unit 12.

The MAC SDU sending unit 12 multiplexes (provides) ID and SN, which are sent by the MAC PDU information sending unit 11, into MAC SDU and sends MAC SDU, into which ID and SN are multiplexed (provided), to the RLC sub-layer. Here, in order to multiplex ID and SN into MAC SDU it is enough to associate MAC SDU with ID and SN. That is, to multiplex ID and SN into MAC SDU includes not only to store ID and SN in MAC SDU as data but also to provide outside of MAC SDU with ID and SN or to associate ID and SN with MAC SDU by use of a pointer.

The erroneous PDU discarding unit 13 discards an erroneous RLC PDU out of RLC PDUs which are sent by the MAC sub-layer, and notifies another erroneous PDU discarding unit 13 of another RLC sub-layer, which processes another radio bearer, of ID which is multiplexed into the erroneous RLC PDU and specifies MAC PDU. Moreover, in the case that the erroneous PDU discarding unit 13 is notified of ID, which specifies MAC PDU, by another erroneous PDU discarding unit 13 of another RLC sub-layer which processes another radio bearer, the erroneous PDU discarding unit 13 checks whether there exists RLC PDU into which the notified ID is multiplexed. In the case that there exists RLC PDU into which the notified ID is multiplexed, the erroneous PDU discarding unit 13 discards RLC PDU into which the notified ID is multiplexed.

The erroneous PDU discarding unit 13 judges whether a relation between SN which indicates the receiving sequence in the MAC sub-layer, and SN which is embedded in the RLC header of RLC PDU is appropriate. In the case of the judgment that the relation is not appropriate, the PDU discarding unit 13 judges that RLC PDU, which includes SN corresponding to the not-appropriate relation, is erroneous, and consequently discards the erroneous RLC PDU, and furthermore notifies another. erroneous PDU discarding unit 13, which belongs to another RLC sub-layer, of ID which is multiplexed into the discarded RLC PDU.

Hereinafter, detection of an error will be described in detail. Here, in the following description, a case that the radio base station eNB is the receiving apparatus, that is, the radio base station eNB receives an uplink signal from the mobile station UE is exemplified.

The MAC sub-layer of the radio base station eNB notifies the mobile station UE of an uplink signal sending request through a down The mobile station UE sends an uplink signal in reply to the uplink signal sending request. The radio base station eNB receives one MAC PDU, which includes MAC SDUs of one or more radio bearers, from the mobile station UE. Here, the receiving sequence of MAC PDU in the HARQ (Hybrid Automatic Repeat request) resending process may not be the same as original sequence in some cases. In the HARQ resending process, a resent pattern is determined with taking it into consideration that all of the erroneous data are not always discarded and the erroneous data is restored in combination with the resent data.

In order to provide each MAC PDU with the unique ID, the MAC PDU information sending unit 11 generates ID which identifies the mobile station UE, and MAC receiving SN which indicates the receiving sequence in the MAC sub-layer, and sends the created ID and the created MAC receiving SN to the MAC SDU sending unit 12. The MAC receiving SN, which indicates the receiving sequence in the MAC sub-layer, is incremented every time when an uplink signal new sending request is notified through the down link signal. Accordingly, even when communication is impossible due to a bad uplink radio state, it is possible to recognize that a sending signal procedure of the mobile station UE advances normally (reply to the next uplink signal sending request). In case of the HARQ resending process, the MAC receiving SN at the first HARQ resending time is used afterwards as the MAC receiving SN.

The MAC SDU sending unit 12 multiplexes information, which is sent by the MAC PDU information sending unit 11, into MAC SDU and sends MAC SDU, into which the information is multiplexed, to the RLC sub-layer. In this case, the MAC SDU sending unit 12 sends a size (amount of data) of MAC SDU together with MAC SDU to the RLC sub-layer.

Figure 3:
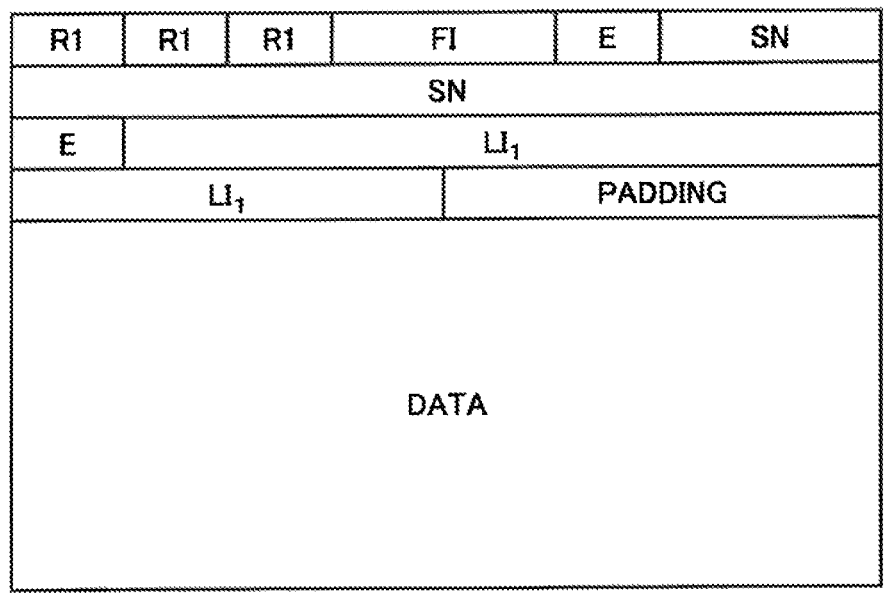
[FIG. 3] shows an example of a format of RLC PDU according to the first exemplary embodiment.
Figure 3:
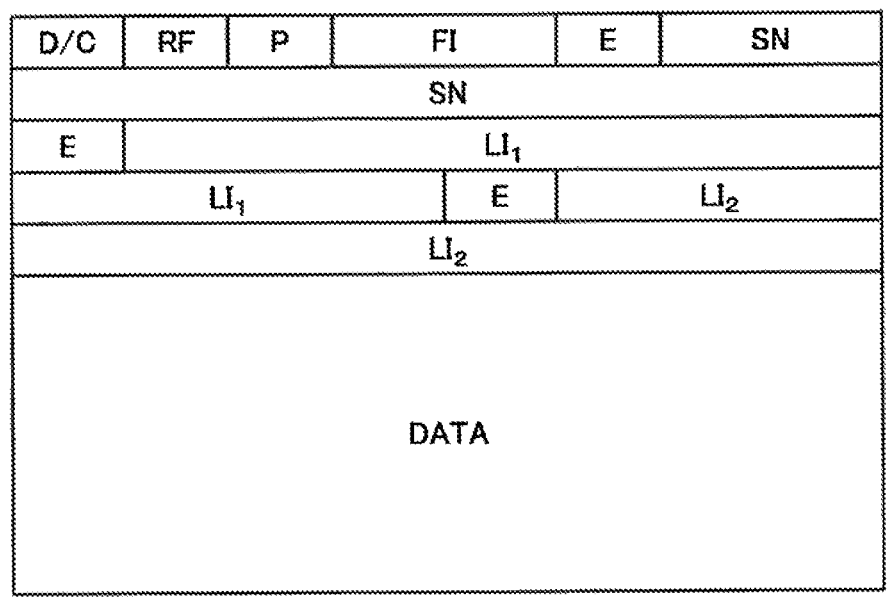
Figure 3:
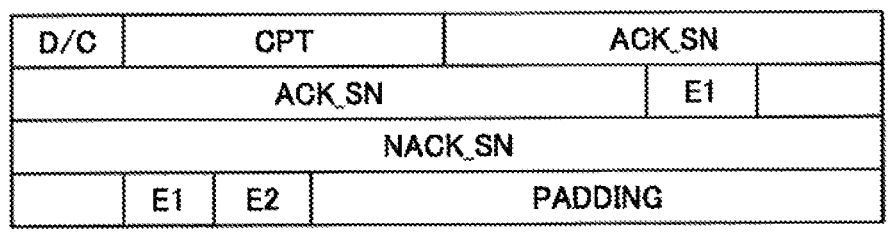

FIG. 3 shows an example of a format of RLC PDU according to the first exemplary embodiment. When the RLC Entity is set, the RLC mode is set to UM (Unacknowledged Mode) (5 bit SN), UM (10 bit SN) or AM (Acknowledged Mode). FIG. 3 (A) shows an example of the format of RLC PDU which is used in the case that the RLC mode is UM (5 bit SN). FIG. 3 (B) shows an example of the format of RLC PDU which is used in the case that the RLC mode is UM (10 bit SN). FIG. 3 (C) shows an example of the format of RLC PDU which is used in the case that the RLC mode is AM. Here, the format of RLC PDU used in each mode is specified by 3GPP.

By checking each field of RLC PDU, the erroneous PDU discarding unit 13 judges whether RLC PDU includes an error.

Several examples of judgments by the erroneous PDU discarding unit 13 will be shown in the following.

In the case that, with reference to the L1 field which indicates Data length except for the last Data, a value of the L1 field is 0, the erroneous PDU discarding unit 13 judges that the corresponding RLC PDU includes an error.

In the case that, with reference to the L1 field which indicates Data length except for the last Data, a total value of a length of the RLC header, the minimum Data size and a sum of values of the L1 field exceeds a size of RLC PDU, the erroneous PDU discarding unit 13 judges that the corresponding RLC PDU includes an error. The minimum Data size is usually 1 byte.

In the case that, with reference to the LI field which indicates the Data length except for the last Data, a total value of the length of the RLC header, the maximum Data size, and the sum of values of the L1 field is less that the size of RLC PDU, the erroneous PDU discarding unit 13 judges that the corresponding RLC PDU includes an error. The maximum Data size depends on a network value which is set to the mobile station UE.

In the case that, with reference to the R1 field which means a reservation bit, a value of the R1 field is not 0, the erroneous PDU discarding unit 13 judges that the corresponding RLC PDU includes an error.

In the case that, with reference to the CPT field which indicates a type of RLC control PDU, a value of the CPT field is not 0, the erroneous PDU discarding unit 13 judges that the corresponding RLC PDU includes an error.

In the case that, with reference to the E field which indicates whether the RLC header is continued, a size of the RLC header is not less than the size of RLC PDU, the erroneous PDU discarding unit 13 judges that the corresponding RLC PDU includes an error.

In the case that, with reference to the E1 field and the E2 field which indicate whether the RLC header is continued, the size of the RLC header is more than the size of RLC PDU, the erroneous PDU discarding unit 13 judges that the corresponding RLC PDU includes an error.

In the case that, with reference to the SN field which indicates sequence of RLC PDU, a value of the SN field changes substantially in comparison with MAC receiving SN, the erroneous PDU discarding unit 13 judges that the corresponding RLC PDU includes an error. Here, in the case that a difference between the value of the SN field and MAC receiving SN exceeds a predetermined threshold level, it is judged that the value of the SN field changes substantially in comparison with MAC receiving SN.

In the case that, with reference to the SN field which indicates the sequence of RLC PDU, sequence of the value of SN field is reverse to one of MAC receiving SN, the erroneous PDU discarding unit 13 judges that the corresponding RLC PDU includes an error. That is, for example, in the case that the value of the SN field is decreasing while MAC receiving SN is increasing, it is judged that the sequence of the value of SN field is reverse to one of MAC receiving SN.

In the case that, with reference to the ACK_SN field and the NACK_SN field which indicate a receiving state, a value of the NACK_SN field is set to be larger than a value of the ACK_SN field with taking a cyclic use of SN into consideration, the erroneous PDU discarding unit 13 judges that the corresponding RLC PDU includes an error.

In the case that, with reference to the ACK_SN field and the NACK_SN field which indicate the receiving state, SN of RLC PDU, which is not sent, is set to the value of the ACK_SN field and the value of the NACK_SN field, the erroneous PDU discarding unit 13 judges that the corresponding RLC PDU includes an error.

In the case that, with reference to the ACK_SN field and the NACK_SN field which indicate the receiving state, a value of SN, which is delayed by a less than half cycle in comparison with SN of RLC PDU which will be sent next, is set to the value of the ACK_SN field and the value of the NACK_SN field with taking the cyclic use of SN into consideration, the erroneous PDU discarding unit 13 judges that the corresponding RLC PDU includes an error.

In the case that, with reference to the NACK_SN field which indicates the receiving state, a value of SN of RLC PDU, which has been notified as ACK, is set to the value of the NACK_SN, the erroneous PDU discarding unit 13 judges that the corresponding RLC PDU includes an error.

In the case that, with reference to the NACK_SN field which indicates the receiving state, a plurality of values of NACK_SN, which are notified, are not set in ascending order, the erroneous PDU discarding unit 13 judges that the corresponding RLC PDU includes an error.

In the case that, with reference to the SOstart field and the SOend field which indicate a part of NACK, a part of RLC PDU which has been already notified as ACK is set as NACK, the erroneous PDU discarding unit 13 judges that the corresponding RLC PDU includes an error.

In the case that, with reference to the SOstart field and the SOend field which indicate the part of NACK, a plurality of values of the SOstart field and a plurality of values of the SOend field for the same NACK_SN are notified and the corresponding part of NACK is set plural times, the erroneous PDU discarding unit 13 judges that the corresponding RLC PDU includes an error.

In the case that, with reference to the SOstart field and the SOend field which indicate the part of NACK, a plurality of values of the SOstart field and a plurality of values of the SOend field for the same NACK_SN are notified, and the values of the SOstart field and the values of the SOend field are not set in ascending order, the erroneous PDU discarding unit 13 judges that the corresponding RLC PDU includes an error.

In the case that, when using the SOstart and the SOend which indicate the part of NACK, the SOstart and the SOend are not coincident with a sent segment, the erroneous PDU discarding unit 13 judges that the corresponding RLC PDU includes an error.

In the case that, with reference to the H field which indicates continuity of the first Data field and the last Data field, the last Data of the just previous RLC PDU is indicated to be continued, but the first Data of the present RLC PDU is not indicated to continue, the erroneous PDU discarding unit 13 judges that the corresponding RLC PDU includes an error.

In the case that, with reference to the F1 field which indicates the continuity of the first Data field and the last Data field, the last Data of the just previous RLC PDU is indicated as the end of data, but the first Data of the present RLC PDU is not indicated as the start of data, the erroneous PDU discarding unit 13 judges that the corresponding RLC PDU includes an error.

In the case that, when using the SO field which indicates a position of a AMD (Acknowledged Mode Data) PDU segment of AMD PDU, and the LSF field which indicates termination, the AMD PDU segment includes all of AMD PDU, the erroneous PDU discarding unit 13 judges that the corresponding RLC PDU includes an error.

In the case that, when using the SO field which indicates the position of the AMD (Acknowledged Mode Data) .PDU segment of AMD PDU, the LSF field which indicates termination, and a size of the AMD PDU segment, LSF is equal to 1 but termination of the AMD PDU segment is not coincident with termination of AMD PDU, the erroneous PDU discarding unit 13 judges that the corresponding RLC PDU includes an error.

In the case that, when using the SO field which indicates the position of the AMD PDU segment of AMD PDU, the LSF field which indicates the termination, and the size of the AMD PDU segment, LSF is equal to 0 but the termination of the AMD PDU segment is coincident with the termination of AMD PDU, the erroneous PDU discarding unit 13 judges that the corresponding RLC PDU includes an error.

In the case that, when using the SO field which indicates the position of the AMD PDU of AMD PDU segment, and the size of the AMD PDU segment, the termination of the AMD PDU segment exceeds the termination of AMD PDU, the erroneous PDU discarding unit 13 judges that the corresponding RLC PDU includes an error.

In the case that, with taking it into consideration that the previous RLC PDU includes an error, it is judged the present RLC PDU includes an error, and then NACK is transferred to the mobile station UE and a plurality of RLC PDUs, which are resent by the mobile station UE due to NACK and include the same RLC SN, are judged to include an error, the erroneous PDU discarding unit 13 judges that the present RLC PDU includes no error.

As a remedy against an error which the previous RLC PDU includes, it is also possible not to send ACK of the previous RLC PDU to the mobile station UE until it is judged that the previous RLC PDU does not include any error through receiving the present RLC PDU, or until a timer indicates that a predetermined period of time elapses with taking it into consideration that there is no data for transmission.

Since a part which UE recognizes as ACK is discarded even if the part is resent, the present information is judged to be correct in the case that the same information is received plural times, even if the SOstart and the SOend which indicate the part of NACK is not coincident with the sending segment.

In the case that there exists RLC PDU which is judged to include an error, the erroneous RLC PDU is discarded. Furthermore, ID which is embedded in RLC PDU judged to include the error and which specifies MAC PDU and the mobile UE, and MAC receiving SN which indicates the receiving sequence are transferred to another erroneous PDU discarding unit 13 of another RLC sub-layer which processes another radio bearer. The erroneous PDU discarding unit 13, which receives ID to specify the erroneous MAC PDU, checks whether there is RLC PDU including the transferred ID. In the case that there exists RLC PDU which includes the transferred ID, the erroneous PDU discarding unit 13 discards the corresponding RLC PDU.

The receiving data storage processing unit 14 stores RLC PDU, which does not include any error and which is sent from the erroneous PDU discarding unit 13, in a receiving buffer memory and carries out a sequence correcting process to correct the receiving sequence of RLC PDU which is stored in the receiving buffer memory. In the case that the SDU restoring unit 15 can restore RLC SDU on the basis of RLC PDU stored in the receiving buffer memory, the SDU restoring unit 15 restores RLC SDU and sends the restored RLC SDU to the PDCP sub-layer.

Figure 4:
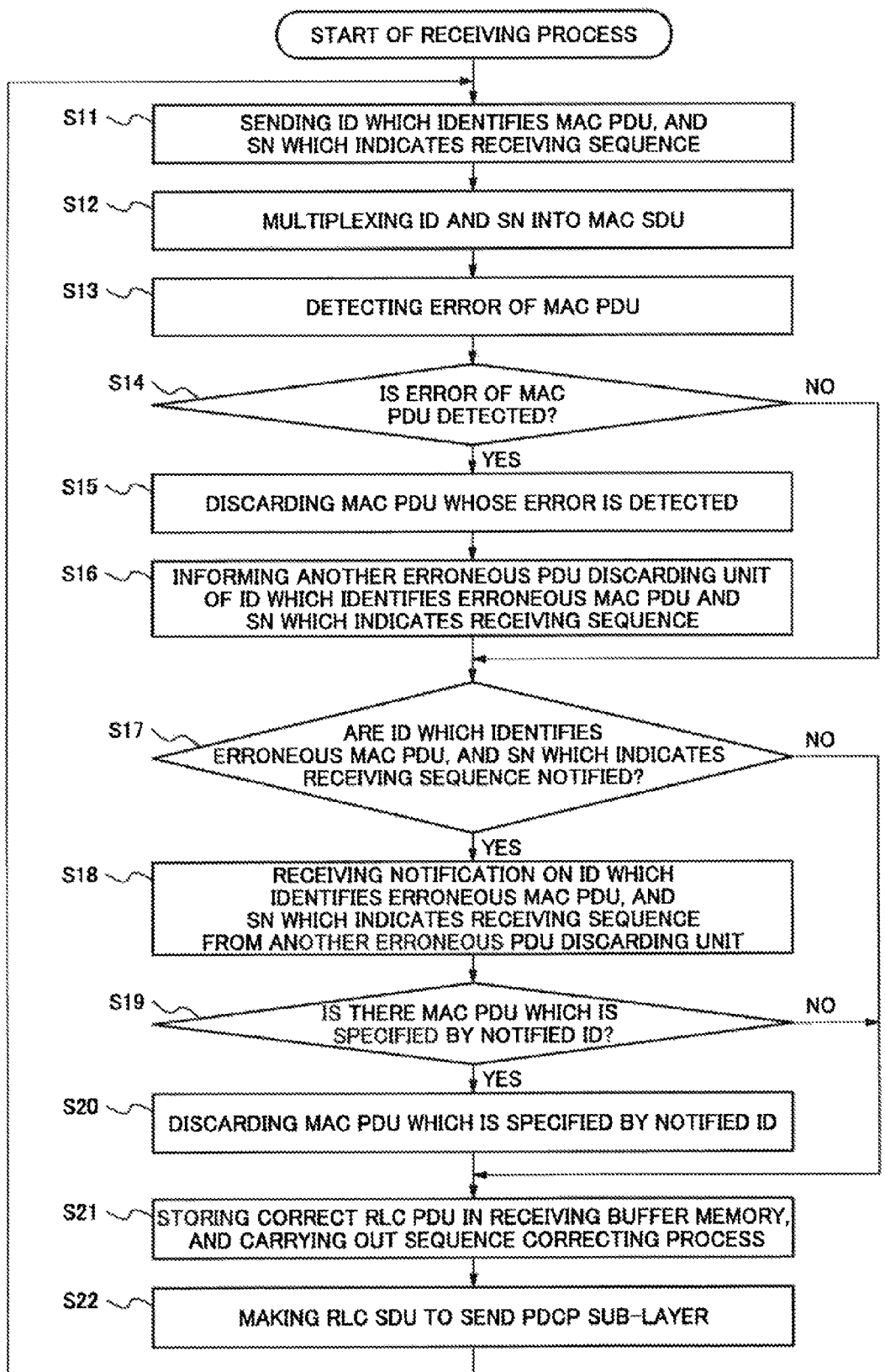
[FIG. 4] shows an example of an operation (receiving process) of the receiving apparatus shown in FIG. 2.

FIG. 4 is a flowchart explaining an example of an operation (receiving process) of the receiving apparatus shown in FIG. 2. The MAC PDU information sending unit 11 sends ID which specifies MAC PDU, and SN which indicates the receiving sequence to the MAC SDU sending unit 12 (Step S11). The MAC SDU sending unit 12 multiplexes (adds) ID and SN into MAC SDU (Step S12). The erroneous PDU discarding unit 13 detects an error of RLC PDU (Step S13). Here, it is possible to detect the error also by use of at least one method mentioned above. The erroneous PDU discarding unit 13 judges whether an error of RLC PDU is detected (Step S14).

In the case that it is judged that the error of RLC PDU is detected (Yes in Step S14), the erroneous PDU discarding unit 13 discards RLC PDU of which the error is detected (Step S15). Moreover, the erroneous PDU discarding unit 13 notifies another erroneous PDU discarding unit 13 of ID and SN which are embedded in the erroneous RLC PDU (Step S16).

On the other hand, in the case that it is judged that any error of RLC PDU is not detected (No in Step S14), the processes of Step S15 and Step S16 are skipped.

In Step S17, the erroneous PDU discarding unit 13 judges whether ID and SN, which are embedded in the erroneous RLC PDU, are notified by another erroneous PDU discarding unit 13. In the case that it is judged that ID and SN are notified by another erroneous PDU discarding unit 13 (Yes in Step S17), the erroneous PDU discarding unit 13 receives notification on ID and SN, which are embedded in the erroneous RLC PDU, from another erroneous PDU discarding unit 13 (Step S18).

In Step S19, the erroneous PDU discarding unit 13 judges whether there is RLC PDU in which the notified ID is embedded. In the case that it is judged that there is RLC PDU in which the notified ID is embedded (Yes in Step S19), the erroneous PDU discarding unit 13 discards RLC PDU in which the notified ID is embedded (Step S20).

On the other hand, in the case that it is judged that there is no RLC PDU in which the notified ID is embedded (No in Step S19), the process of Step S20 is skipped.

Moreover, in the case that it is judged that ID and SN are not notified by another erroneous PDU discarding unit 13 (No in Step S17), the processes of Steps S18 to S20 are skipped.

In Step S21, the receiving data storage processing unit 14 stores RLC PDU, which does not include any error and which is sent by the erroneous PDU discarding unit 13, in the receiving buffer memory and carries out the sequence correcting process to correct the receiving sequence of RLC PDU which is stored in the receiving buffer memory. In the case that the SDU restoring unit 15 can restore RLC SDU on the basis of RLC PDU stored in the receiving buffer memory, the SDU restoring unit 15 restores RLC SDU and sends the restored RLC SDU to the PDCP sub-layer. (Step S22).

As described above, according to the first exemplary embodiment, through detecting RLC PDU, which includes an error, with high accuracy and discarding the erroneous RLC PDU, it is possible to prevent restoring RLC SDU by use of abnormal data and furthermore it is possible to carry out the normal ARQ resending control since the similar control is carried out for RLC control PDU, as mentioned above. That is, according to the first exemplary embodiment, it is possible to discard erroneous data more surely, and consequently can receive correct data more surely.

Here, it may be preferable that the above-mentioned processes are carried out in the MAC sub-layer. In this case, to check RLC SN in the RLC header or the like is carried out in the MAC sub-layer. It is also possible to carry out more accurate error process through checking a Data part. It is possible to detect an error, for example, through checking continuity of PDCP SN of the PDCP header included in the Data part or checking a value of the known bit.

Here, the receiving apparatus is not limited to the radio base station eNB, and it is apparent that the receiving apparatus may be the mobile station UE. In this case, specifically, the mobile station UE receives a downlink signal from the radio base station eNB.

It is possible that hardware or software carries out a series of processes mentioned above. In the case that a series of processes is carried out by software, a program which composes the software is installed from a program recording medium or the like in a computer which is mounted on dedicated hardware, a general-purpose computer which can carry out various functions through installing various programs, or the like.

Here, it may be preferable that the program, which the computer executes, is carried out sequentially on the basis of the sequence described in the present specification, or the program is carried out in parallel, or the program is carried out at a necessary timing such as a call timing.

Figure 5:
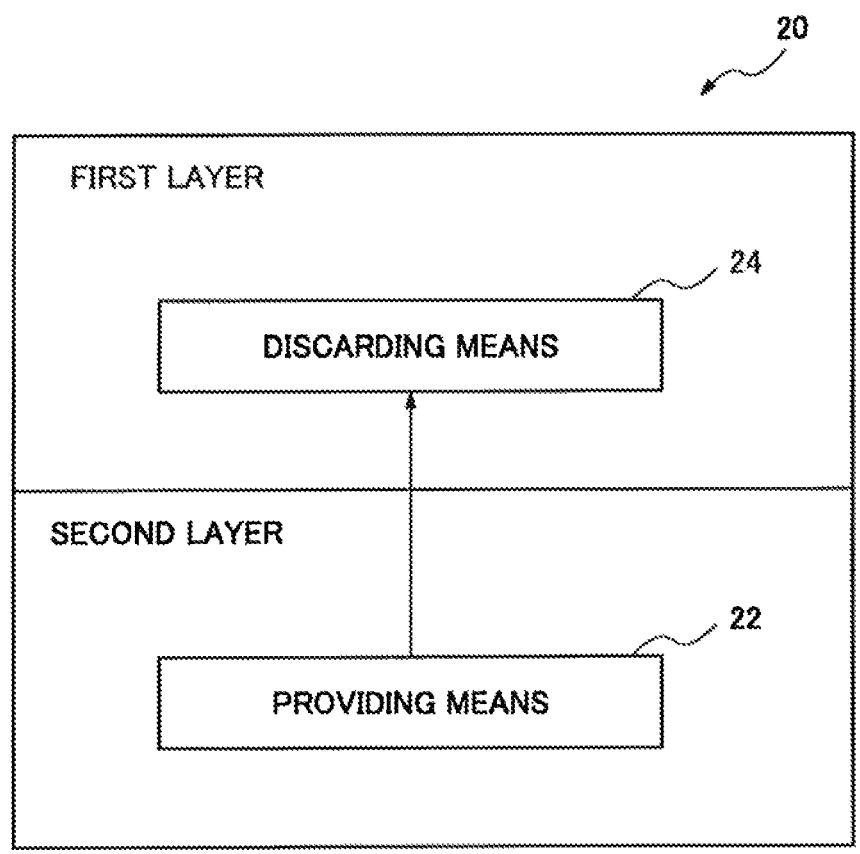
[FIG. 5] is a block diagram showing an. exemplary configuration of a receiving apparatus according to a second exemplary embodiment of the present invention.
Figure 6:
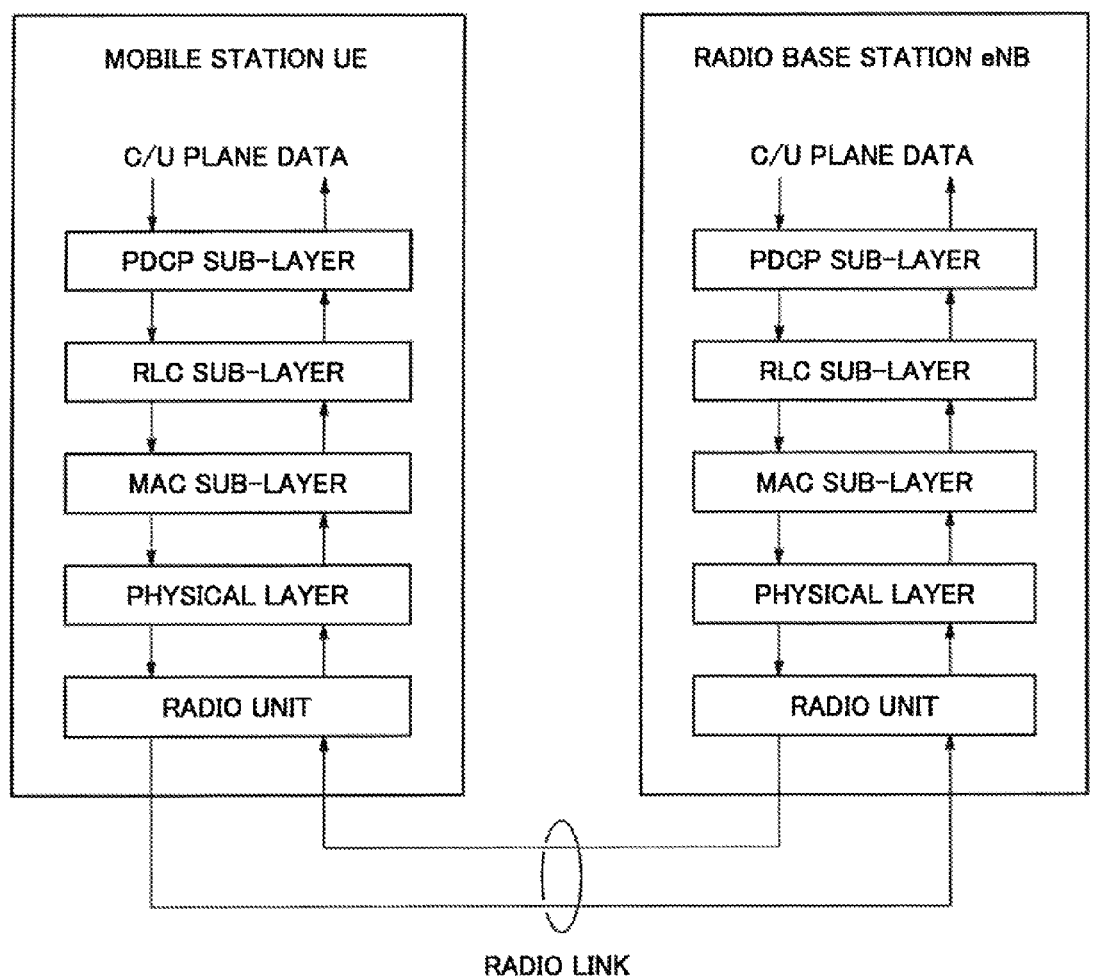
[FIG. 6] is a block diagram explaining a general configuration of the radio access network in the mobile communication system based on the LTE method.
Figure 7:
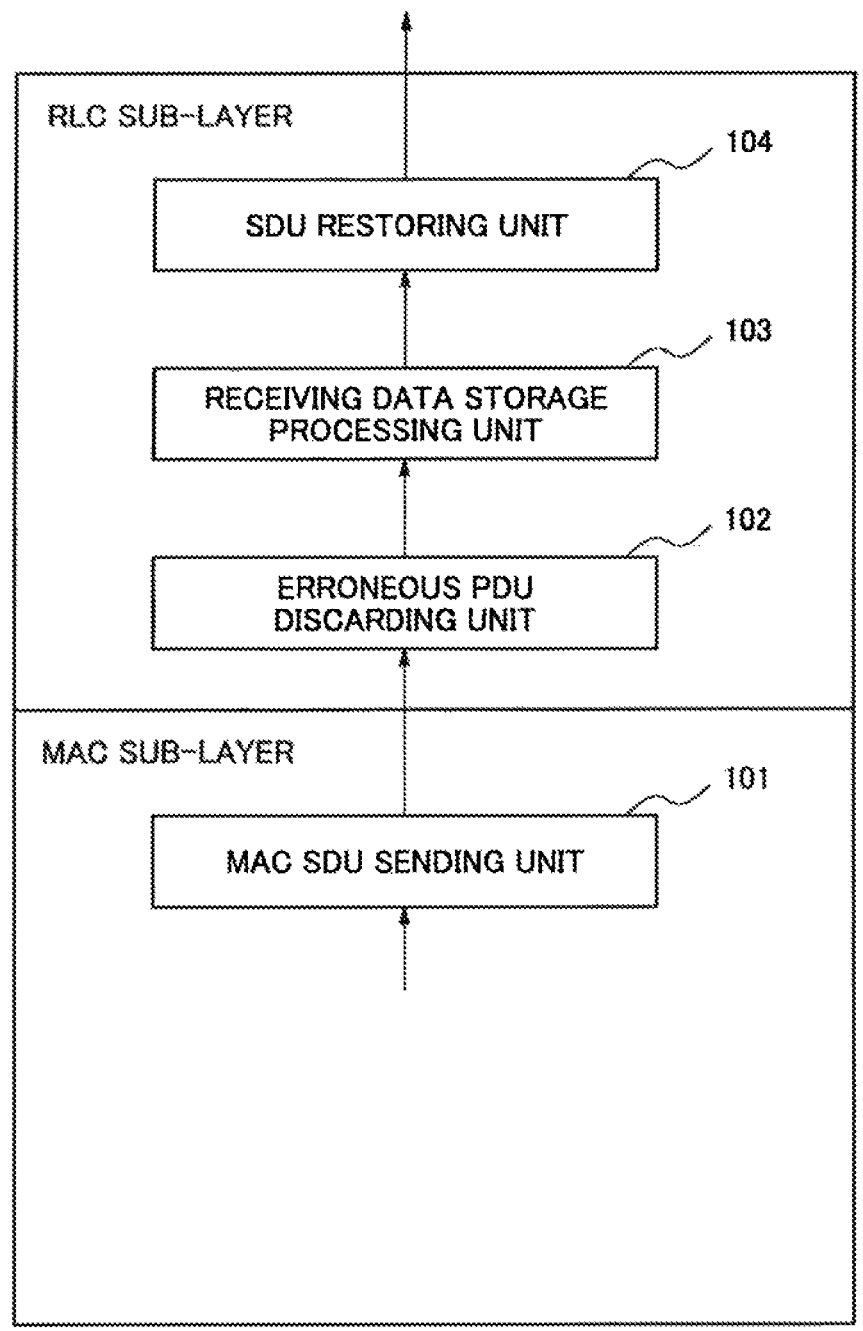
[FIG. 7] is a block diagram explaining a general configuration of the receiving apparatus in the mobile communication system shown in FIG. 6.
Figure 8:
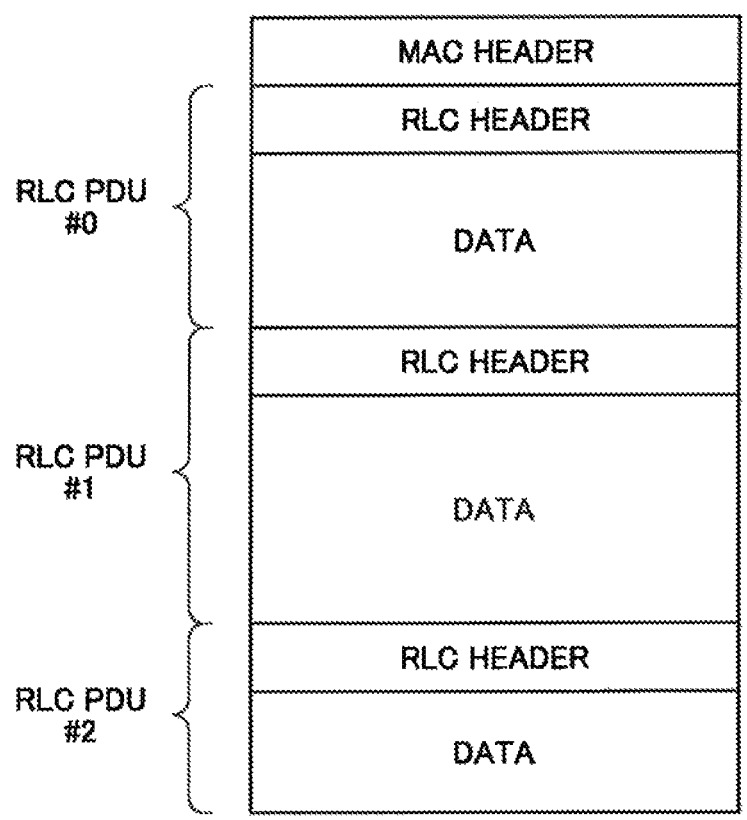
[FIG. 8] shows a general MAC PDU.

FIG. 5 is a block diagram showing an exemplary configuration of a receiving apparatus 20 according to a second exemplary embodiment of the present invention. The receiving apparatus 20 receives data by use of a second protocol data unit of a second layer which stores a plurality of first protocol data units of a first layer set per each of plural radio bearers, and which is a lower layer of the first layer.

The receiving apparatus 20 includes a providing means 22 in the second layer and includes a discarding means 24 in the first layer. The providing means 22 provides the first protocol data unit, which is stored in the second protocol data unit, with specific information which specifies the second protocol data unit. In the case that a predetermined first protocol data unit includes an error, the discarding means 24 discards another first protocol data unit, which is stored in a second protocol data unit storing the erroneous first protocol data unit, with reference to the specific information.

According to the second exemplary embodiment mentioned above, it is possible to discard erroneous data more surely, and consequently it is possible to receive correct data more surely.

Here, according to the second exemplary embodiment mentioned above, it is possible to define the first layer as the RLC (radio link control) sub-layer, and define the second layer as the MAC (medium access control) sub-layer.

Moreover, according to the second exemplary embodiment mentioned above, the providing means 22 can provide the first protocol data unit with number which indicates sequence of receiving the second protocol data unit. Then, with reference to the number, the discarding means 24 can judge whether the first protocol data unit includes an error.

Moreover, according to the second exemplary embodiment mentioned above, the discarding means 24 is arranged correspondingly to each of a plurality of radio bearers. In the case that the first protocol data unit includes an error, the discarding means 24 can notify another discarding means of the specific information with which the erroneous first protocol data unit is provided. Meanwhile, when the discarding means 24 is provided with the specific information by another discarding means, the discarding means 24 can discard the first protocol data unit which is provided with the notified specific information.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese Patent Application No. 2009-107969, filed on Apr. 27, 2009, the disclosure of which is incorporated herein in its entirety by reference.

Description of Codes
11 MAC PDU information sending unit
12 MAC SDU sending unit
13 Erroneous PDU discarding unit
14 Receiving data storage processing unit
15 SDU restoring unit
20 Receiving apparatus
22 Providing means

The invention claimed is:

1. A receiving apparatus to receive data by use of a second protocol data unit, which stores a plurality of first protocol data units of a first layer set for each of plural radio bearers and which is based on a second layer corresponding to a lower layer of the first layer, comprising:
   a providing unit for providing the first protocol data unit, which is stored in the second protocol data unit with specific information specifying the second protocol data unit in the second layer; and
   a discarding unit for discarding another first protocol data unit, which is stored in the second protocol data unit storing the erroneous first protocol data unit with reference to the specific information in the case that a predetermined first protocol data unit includes an error in the first layer.

2. The receiving apparatus according to claim 1, wherein the first layer is the RLC (Radio Link Control) sub-layer, and wherein
the second layer is the MAC (Medium Access Control) sub-layer.

3. The receiving apparatus according to claim 1, wherein the providing unit provides the first protocol data unit with number which indicates sequence of receiving the second protocol data unit, and wherein
with reference to the number, the discarding unit judges whether the first protocol data unit includes an error.

4. The receiving apparatus according to claim 1, wherein the discarding unit is arranged correspondingly to each of plural radio bearers, wherein
in the case that the first protocol data unit includes an error, the discarding unit notifies another discarding unit of the specific information with which the erroneous first protocol data unit is provided, and wherein
in the case that the discarding unit is notified of the specific information by another discarding unit, the discarding unit discards the first protocol data unit which is provided with the notified specific information.

5. A receiving method to receive data by use of a second protocol data unit, which stores a plurality of first protocol data units of a first layer set for each of plural radio bearers and which is based on a second layer corresponding to a lower layer of the first layer, comprising:
   providing the first protocol data unit, which is stored in the second protocol data unit with specific information specifying the second protocol data unit in the second layer; and
   discarding another first protocol data unit, which is stored in the second protocol data unit storing the erroneous first protocol data unit with reference to the specific information in the case that a predetermined first protocol data unit includes an error in the first layer.

6. A program for making a computer of a receiving apparatus to receive data by use of a second protocol data unit, which stores a plurality of first protocol data units of a first layer set for each of plural radio bearers and which is based on a second layer corresponding to a lower layer of the first layer, execute processes comprising:
   a process of providing the first protocol data unit, which is stored in the second protocol data unit with specific information specifying the second protocol data unit in the second layer; and
   a process of discarding another first protocol data unit, which is stored in the second protocol data unit storing the erroneous first protocol data unit with reference to the specific information in the case that a predetermined first protocol data unit includes an error in the first layer.

* * * * *